UNITED STATES PATENT OFFICE.

CHARLES SHUTE, OF PHILADELPHIA, PENNSYLVANIA.

IMPROVEMENT IN MEDICAL COMPOUNDS OR SALVES FOR RING-BONE, SPAVIN, &c.

Specification forming part of Letters Patent No. 126,124, dated April 23, 1872.

Specification describing a certain compound called "Dr. Shute's Cure for Spavin, Ring-Bone, Curb, Splints, Wind-Galls, and Thorough-Pins," invented and discovered by CHARLES SHUTE, of the city of Philadelphia and State of Pennsylvania, to be used in the cure of horses afflicted with spavin, ring-bone, curb, splints, wind-galls, and thorough-pins.

The nature of the invention or discovery of the said CHARLES SHUTE consists of the mixing and boiling together of the ingredients hereinafter mentioned—that is to say, With three pounds of hog's lard melt and mix six ounces of mercurial ointment and two ounces of the ointment of red oxide of mercury; add three ounces of pulverized cantharides, three ounces of pulverized gum-euphorbium, two ounces of pulverized horse-wart; stir and mix well together, then add four ounces of the spirits of turpentine, three ounces of the tincture of iodine, and three drams of corrosive sublimate.

I claim as my invention and discovery—

The said compound or composition of matter as a remedy and cure of horses afflicted with spavin, ring-bone, curb, splints, wind-galls, and thorough-pins, substantially as described.

CHAS. SHUTE.

Witnesses:
   THEO. H. OEHLSCHLAGER,
   J. P. DELANEY.